Patented Jan. 10, 1939

2,143,587

UNITED STATES PATENT OFFICE 2,143,587

TREATMENT OF VITAMIN-CONTAINING OILS AND PRODUCTS OBTAINED THEREFROM

Hein Israel Waterman, Delft, Cornelus van Vlodrop, Rotterdam, and Johannes Adrianus van Dijk, The Hague, Netherlands, assignors to Imperial Chemical Industries Limited, a corporation of Great Britain No Drawing. Application February 20, 1936, Serial No. 64,976. In Great Britain February 21, 1935

6 Claims. (Cl. 99—122)

This invention or discovery relates to treatment of vitamin-containing oils and the products obtained therefrom; and it comprises a method of directly securing from raw fish oils a concentrated vitamin preparation substantially free of objectionable taste and odor, which comprises subjecting the oil to short-path distillation under such conditions as to yield a distillate containing most of the vitamin content of the raw oil in concentrated form, and subjecting the distillate to a mild hydrogenation, whereby permanently odorless and tasteless preparations are obtained; and it further comprises a method of making improved margarine preparations combining the vitamins of fish oil with other oils wherein fish oil is subjected to short-path distillation, the distillate is mixed with a hydrogenatable oil or fat and the mixture is subjected to mild hydrogenation to produce an improved margarine; and it further comprises the products of such processes; all as more fully hereinafter set forth and as claimed.

Many fish oils contain valuable proportions of vitamins and have found use in medicine. But few, if any, are capable of being incorporated into foodstuffs, because of their decidedly unpleasant taste and odor. The glycerides of fish oils are not desirable components of foods; partly because of the unpleasant odor of the contained fatty acids; valeric, caproic, etc. Attempts have been made to deodorize fish oils, without much success. Fish liver oils can be subjected to hydrogenation at relatively low temperature and under pressure, to yield products which retain some of the vitamin content of the raw oil and which are, immediately after production, quite free of objectionable taste and odor. But the improvement is not permanent. No matter how carefully the products are stored, they are likely to give off, after a time, a very disagreeable acrid odor due to development of fatty acids. Hence, such preparations are not desirable in foodstuffs. It is also known that fish liver oils can be subjected to short-path distillation to secure concentrates containing most of the vitamin content. While mere short-path distillation in many cases produces distillates which are by no means free from taste and odor, such preparations are an improvement in that less of them is required for a given vitamin content. But they have the same disadvantage of hydrogenated fish oils in that they develop very unpleasant taste and odor on standing. Sometimes the taste and odor are those characteristic of raw oil and sometimes they are different, but they are always bad.

According to the present invention we provide a way for producing from fish oils vitamin preparations which are concentrated as regards vitamins but which are permanently free of objectionable taste and odor. The preparations can be freely admixed with margarine etc., and the resulting products can be stored indefinitely. We achieve this result by subjecting fish liver oils to short-path distillation to secure a distillate containing the vitamins in concentrated form and we then subject the distillate to a mild hydrogenation. The resulting product is permanently free of taste and odor.

We have further discovered a way to make superior margarine products, by producing a concentrated distillate as described, admixing this with a fat or oil capable of being hydrogenated and subjecting the mixture to a mild hydrogenation, to secure a product of the desired consistency. This proves to be a very simple and effective way of making high grade margarine, high in nutriment and remaining sweet indefinitely.

The extent to which the mild hydrogenation is carried out depends mostly on the type of product desired. Deodorization appears to occur rapidly compared with saturation of the oily triglycerides which would result in undue thickening and since vitamin A itself is destroyed by long exposure to hydrogen under pressure at elevated temperatures, it is advantageous to keep the reaction time short; long enough to effect deodorization and a certain degree of saturation without serious loss of vitamin A or undue thickening; thickening beyond the consistency desirable in margarine. This condition being met, the degree of hydrogenation can be adjusted within rather wide limits.

The high vacuum distillation operation is usually effected under the conditions of so-called shortpath distillation, i. e. employing an apparatus in which the distilling and condensing surfaces are separated by a short distance of the order of one half to a few inches and effecting the distillation under a pressure of between about $10^{-2}$–$10^{-6}$ mm. Hg.

In a modification of the invention particularly applicable to the manufacture of margarine, the oil is first subjected to high vacuum distillation and the concentrate obtained, instead of being hardened per se, is mixed in with the other liquefiable fats serving as raw materials for the margarine, the mixture of fats then being subjected to hardening by mild hydrogenation.

An example of a specific embodiment of a process within the purview of the invention is as follows:

A sample of shark liver oil, blue value 120, is treated in a shortpath still under a pressure of $10^{-3}$ mms. Hg, the temperature of the evaporating surface being 260-265° C. The condensate amounts to 13 per cent of the initial quantity of oil, and has a blue value 900. The residue has a blue value 12. The condensate has a strong fishy smell and a burning taste. 30 parts by weight of it are treated in a stirred high-pressure autoclave, in the presence of 1 part of finely divided nickel supported on kieselguhr, under a hydrogen pressure of 250 atmospheres at a temperature of 55° C. After 1½ hours, the pressure has fallen to 215 atmospheres, and the material is removed from the autoclave. This product is a thin paste, free from smell and almost tasteless, and has a blue value 852. If hydrogenation is prolonged beyond the point referred to above, there is liable to be a serious loss of vitamin A, thus after 3¾ hours hydrogenation at 55° C. the product is a pasty solid, odourless and tasteless, but having a blue value of only 610.

In each case the vitamin content goes over into the distillate during the evaporative distillation, while the components of the oil which give rise to odor and taste on long standing, and which may be termed the latent odor-and taste-imparting constituents, remain in the residue and are discarded.

We claim:—

1. A process for producing stable concentrated vitamin-bearing preparations substantially tasteless and odorless and free from tendency to develop objectionable taste and odor on standing, which comprises subjecting a vitamin-containing oil to evaporative distillation under a vacuum of the order of $10^{-2}$ to $10^{-6}$ mm. of mercury, thereby securing as distillate an oil containing most of the vitamin content of the original oil, and subjecting the distillate to mild hydrogenation under conditions causing substantial deodorization of the oil and partial saturation thereof.

2. The process of claim 1 wherein the distillation is carried out under short-path conditions, between an evaporating surface and a substantially coextensive condensing surface spaced therefrom a distance of approximately 1 to 3 centimeters.

3. Process for the production of margarine-like materials comprising oils containing vitamins, which comprises subjecting the oil to a short-path distillation in a high vacuum, mixing the distillate with a fat which is a raw material for margarine, and hardening the mixture by mild hydrogenation.

4. A vitamin animal oil preparation characterized by having a vitamin concentration much higher than that of the raw oil, by being free of matters non-volatile under a vacuum of the order of $10^{-2}$ to $10^{-6}$ mm. of mercury and an elevated temperature, by being hydrogenated and by being permanently substantially free of objectionable odor and taste.

5. A composition of matter selected from the class consisting of foodstuffs, medicaments and starting materials therefor and comprising the preparation of claim 4.

6. A composition of matter comprising mildly hydrogenated edible fat and mildly hydrogenated, concentrated vitamin-containing oil free of all materials non-volatile under the conditions of short path distillation and being permanently free of taste and odor.

HEIN ISRAEL WATERMAN.
CORNELUS van VLODROP.
JOHANNES ADRIANUS van DIJK.